US012808235B2

(12) United States Patent
Suzuki

(10) Patent No.: US 12,808,235 B2
(45) Date of Patent: Nov. 24, 2026

(54) VEHICLE DOOR UNLOCKING APPARATUS

(71) Applicant: SUBARU CORPORATION, Tokyo (JP)

(72) Inventor: Masatoshi Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 48 days.

(21) Appl. No.: 18/739,529

(22) Filed: Jun. 11, 2024

(65) Prior Publication Data

US 2024/0426144 A1 Dec. 26, 2024

(30) Foreign Application Priority Data

Jun. 23, 2023 (JP) ................................ 2023-103457

(51) Int. Cl.

*E05B 77/02* (2014.01)
*E05B 81/04* (2014.01)
*E05B 81/90* (2014.01)

(52) U.S. Cl.

CPC ............. *E05B 77/02* (2013.01); *E05B 81/04* (2013.01); *E05B 81/90* (2013.01)

(58) Field of Classification Search

CPC . E05B 81/90; E05B 77/02; E05B 5/00; E05B 5/003; E05B 15/143; E05B 2015/0413; E05B 79/20

See application file for complete search history.

(56) References Cited

U.S. PATENT DOCUMENTS

| | | | | |
|---|---|---|---|---|
| 7,387,004 | B2 * | 6/2008 | Schutz | E05B 85/107 70/455 |
| 11,802,425 | B2 | 10/2023 | Nam et al. | |
| 11,834,872 | B2 * | 12/2023 | Guerin | E05B 81/90 |
| 2016/0333614 | A1 * | 11/2016 | Bendel | E05B 53/001 |
| 2019/0169889 | A1 * | 6/2019 | Beck | E05B 77/02 |
| 2023/0203853 | A1 * | 6/2023 | Bajul | E05B 85/107 292/336.3 |

FOREIGN PATENT DOCUMENTS

| | | | | |
|---|---|---|---|---|
| DE | 10044902 | A1 * | 4/2002 | E05B 77/34 |
| DE | 10309821 | A1 * | 9/2004 | E05B 77/02 |
| DE | 102020213052 | A1 * | 4/2022 | E05B 81/76 |
| JP | 6180080 | B2 | 8/2017 | |

(Continued)

OTHER PUBLICATIONS

Machine translation of DE 102020213052 A1, accessed Aug. 22, 2025. (Year: 2025).*

(Continued)

*Primary Examiner* — Kristina R Fulton
*Assistant Examiner* — Emily G. Brown
(74) *Attorney, Agent, or Firm* — Rimon P.C.

(57) ABSTRACT

A vehicle door unlocking apparatus is configured to, based on a state of a vehicle, unlock a door of the vehicle locked by a door locker. The vehicle door unlocking apparatus includes a release operator and a module mechanism. The release operator is disposed in the door and configured to unlock the door with a manual operation, and mechanically coupled to the door locker. The module mechanism is configured to cause the release operator to be disposed in the door such that the release operator is protrudable to the outside of the door.

6 Claims, 5 Drawing Sheets

(56) References Cited

FOREIGN PATENT DOCUMENTS

| | | | | |
|---|---|---|---|---|
| JP | 6725146 | B2 | 7/2020 | |
| JP | 2021-110225 | A | 8/2021 | |
| WO | WO-2022189490 | A1 * | 9/2022 | ............. E05B 81/90 |

OTHER PUBLICATIONS

Machine translation of DE 10044902 A1, generated Aug. 23, 2025. (Year: 2025).*

Espacenet, machine translation of DE 10044902 A1, generated Aug. 23, 2025. (Year: 2025).*

* cited by examiner

VEHICLE DOOR UNLOCKING APPARATUS

CROSS-REFERENCE TO RELATED APPLICATIONS

The present application claims priority from Japanese Patent Application No. 2023-103457 filed on Jun. 23, 2023, the entire contents of which are hereby incorporated by reference.

BACKGROUND

The disclosure relates to a vehicle door unlocking apparatus.

A door of a typical vehicle includes an outside door handle and a locker. The locker is unlocked and the outside door handle is pulled toward an occupant when the occupant opens the door from the outside of the vehicle. This releases a locking mechanism of the door and allows the door to be opened by swinging or sliding the door.

A vehicle in recent years includes an electronically controlled release mechanism in which the release of the locking mechanism by pulling the outside door handle is replaced with an electric-control-based release mechanism. When the occupant operates a sensor provided on a door, the electronically controlled release mechanism unlocks the locking mechanism by an actuator, based on a detection performed by the sensor, thereby allowing the occupant to open the door.

The electronically controlled release mechanism allows the occupant to easily release the door locking mechanism in a normal state; however, there is a concern that it is difficult to release the locking mechanism by the actuator upon a vehicle contact or a power loss.

Japanese Patent Nos. 6180080 and 6725146 and Japanese Unexamined Patent Application Publication (JP-A) No. 2021-110225 each disclose a mechanism that makes it possible to manually unlock a door when a vehicle event occurs.

SUMMARY

An aspect of the disclosure provides a vehicle door unlocking apparatus configured to, based on a state of a vehicle, unlock a door of the vehicle locked by a door locker. The vehicle door unlocking apparatus includes a release operator and a module mechanism. The release operator is disposed in the door and configured to unlock the door with a manual operation, and mechanically coupled to the door locker. The module mechanism is configured to cause the release operator to be disposed in the door such that the release operator is protrudable to the outside of the door.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
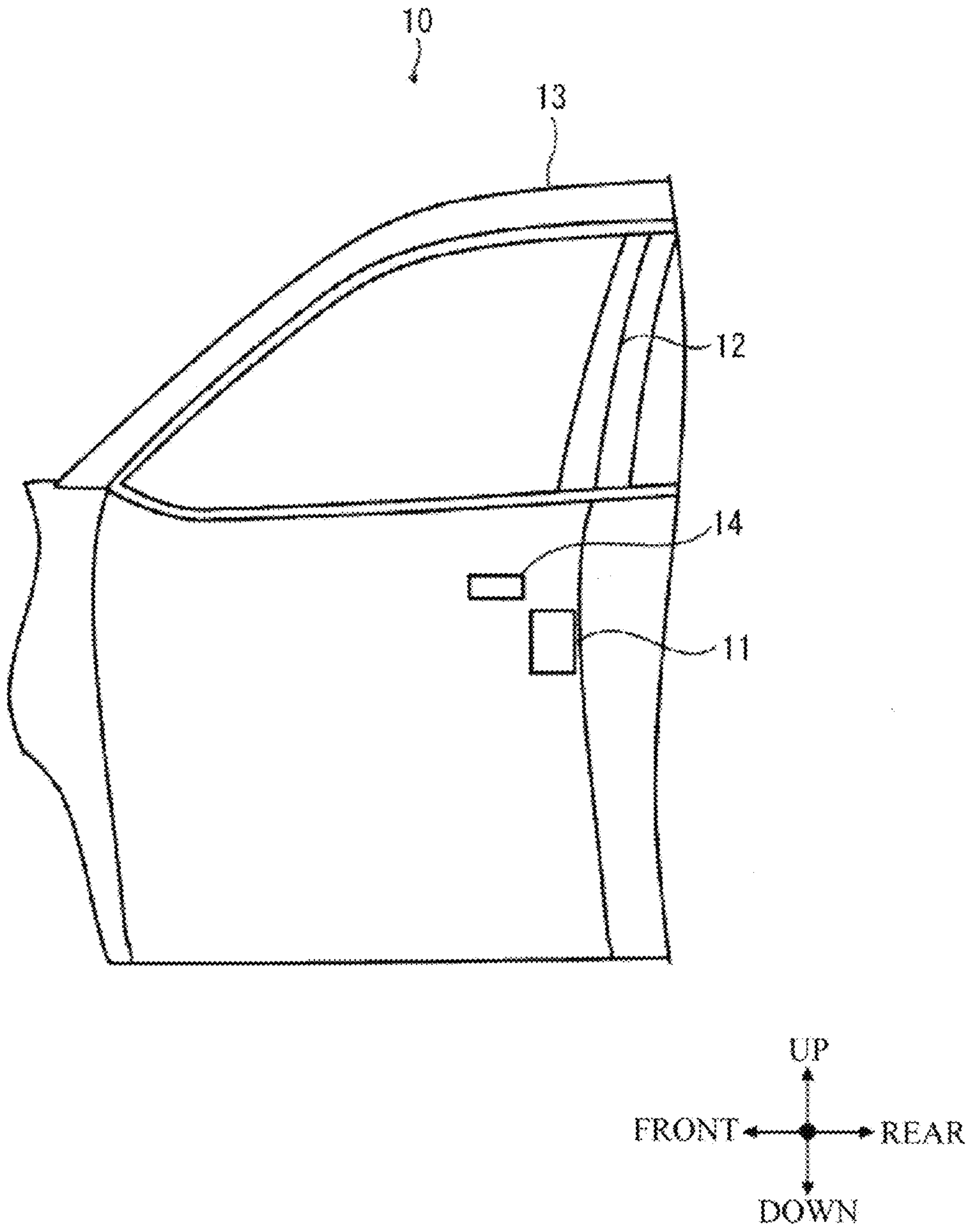
FIG. 1 is a side diagram illustrating a vehicle including a vehicle door unlocking apparatus according to one example embodiment of the disclosure.

The mechanisms described in Japanese Patent Nos. 6180080 and 6725146 and JP-A No. 2021-110225 each have room for improvement from a viewpoint of, for example, safety at the time of unlocking.

For example, the mechanisms disclosed in Japanese Patent Nos. 6180080 and 6725146 and JP-A No. 2021-110225 each apply, for example, a tensile force to a member or the like provided outside a door to unlock the door. Accordingly, there is a possibility that a third party other than an occupant is able to unlock the door by an operation performed from the outside.

For example, the mechanisms disclosed in Japanese Patent Nos. 6180080 and 6725146 and JP-A No. 2021-110225 can make it difficult to return the door to an original state when the door is mechanically unlocked upon a vehicle contact or a power loss. Accordingly, it is necessary to rely on a facility such as a maintenance company in order to return the door in the unlocked state to the original state, raising an issue of time and cost to return the door to the original state.

It is desirable to provide a vehicle door unlocking apparatus that makes it possible to easily unlock a door upon an event such as a vehicle contact, and that is advantageous in safety and cost.

In the following, a vehicle door unlocking apparatus 20 and a vehicle 10 according to some example embodiments of the disclosure will be described in detail with reference to the drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

It should be noted that the directions of front, rear, up, down, right, and left are referred to in the following description, in which the right and the left are those where the vehicle 10 is viewed from the front.

FIG. 1 is a side diagram illustrating the vehicle 10 including the vehicle door unlocking apparatus 20.

The vehicle 10 may be any vehicle such as an engine-driven vehicle, an electric vehicle (EV), a hybrid electric vehicle (HEV), or a plug-in hybrid electric vehicle (PHEV).

A door 12 may be attached to a body 13 of the vehicle 10. The door 12 may be disposed at the front of the body 13, and freely open and close a side opening of the body 13. For example, a front end of the door 12 may be rotatably coupled to the body 13, and may be pivotable about a part where the front end of the door 12 is rotatably coupled to the body 13. In some embodiments, the door 12 may be a sliding door.

In some embodiments, a door locker 11 may be configured to perform a locking operation and an unlocking operation of the door 12, based on an electric control. The door locker 11 may be disposed at the rear of the door 12. The door locker 11 may have an unillustrated striker and an unillustrated latch. The striker may be attached to a pillar of the body 13. The latch may be attached to a rear end of the door 12. When the door locker 11 is in a locked state, the latch may latch the striker, causing the door 12 to be in a closed state. When the door locker 11 is in an unlocked state, the latch does not latch the striker, allowing an occupant or a third party to open the door 12.

An opening and closing operator 14 may be an element that is to be operated to open the door 12 when a person such as the occupant rides on the vehicle 10. The opening and closing operator 14 may cause the door locker 11 to be in an open state by the occupant operating a mechanism such as a touch mechanism or a push mechanism as described later. The opening and closing operator 14 may cause the door locker 11 to be in the closed state by the occupant operating the mechanism such as the touch mechanism or the push mechanism again.

In some embodiments, the vehicle 10 may not have an existing outdoor handle adjacent to the opening and closing operator 14. This configuration helps to improve an appearance design of the door 12 and the vehicle 10, and to reduce an air resistance upon vehicle traveling.

The vehicle 10 includes the vehicle door unlocking apparatus 20. The vehicle door unlocking apparatus 20 is configured to unlock the door 12 locked by the door locker 11 in an emergency such as a power loss or a contact event of the vehicle 10, based on a state of the vehicle 10. The vehicle door unlocking apparatus 20 will be described later with reference to the drawings including FIG. 3A.

Figure 2A:
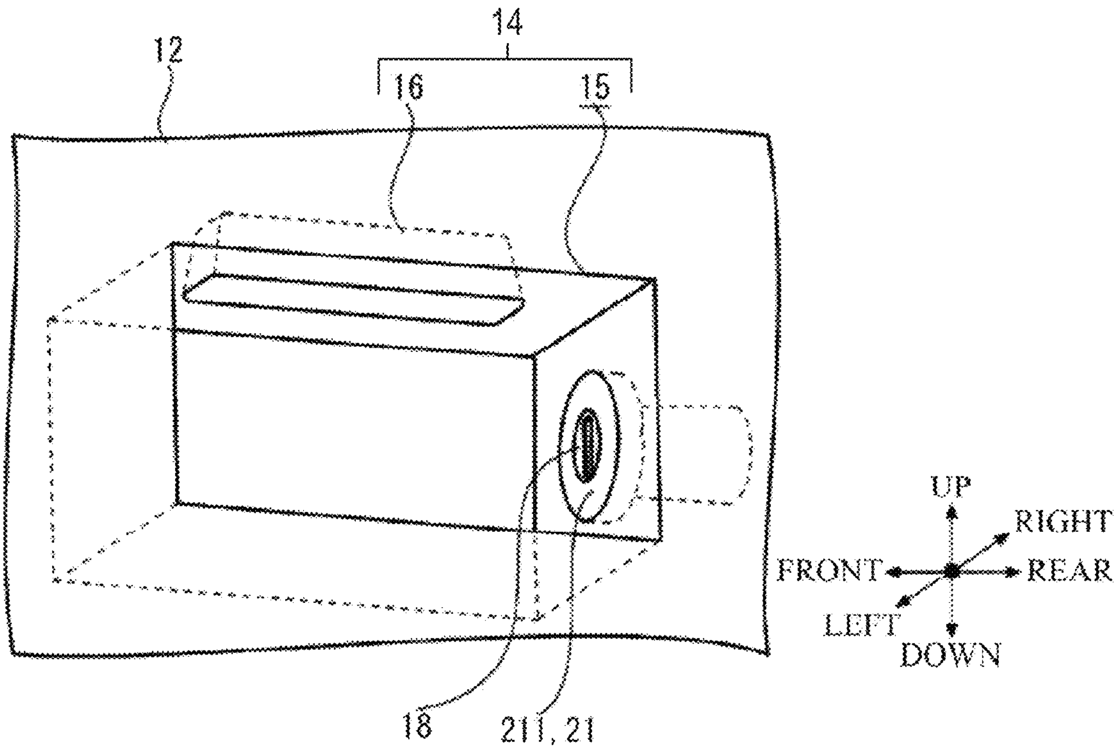
FIG. 2A is a perspective view of the vehicle door unlocking apparatus illustrated in FIG. 1 and its nearby configurations.
Figure 2B:
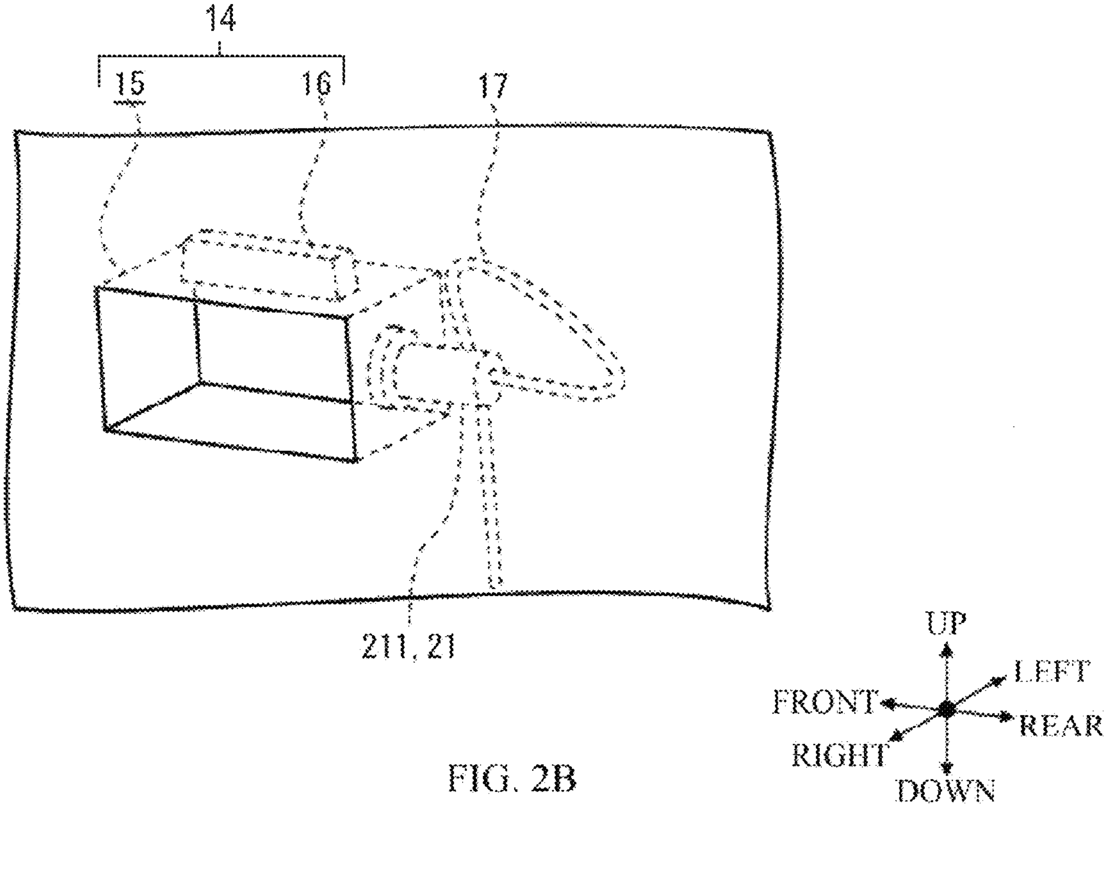
FIG. 2B is a perspective view of the vehicle door unlocking apparatus illustrated in FIG. 1 and its nearby configurations as viewed from another angle.

FIG. 2A is a perspective view of the vehicle door unlocking apparatus 20 and its nearby configurations as viewed from a lower right. FIG. 2B is a perspective view of the vehicle door unlocking apparatus 20 and its nearby configurations as viewed from an upper right.

Referring to FIGS. 2A and 2B, the opening and closing operator 14 may include a recess 15 and a locking operator 16. The opening and closing operator 14 may be an element that is to be manually operated by a person such as the occupant when the door 12 is to be opened or closed.

The recess 15 may be a region in which an outer panel configuring an outer surface of the door 12 is recessed toward the left, which is an inner side in a width direction of the vehicle 10. For example, the recess 15 may be a concave region having a substantially rectangular parallelepiped shape. The recess 15 may be, for example, shaped and sized to allow an insertion of a tip of a hand of the occupant.

The locking operator 16 may be a switch such as a touch switch or a push switch. The switch of the locking operator 16 may be exposed downward from the top of the recess 15. An electric signal may be transmitted from the locking operator 16 to a later-described processor 24 when the occupant touches or presses a lower surface of the locking operator 16.

The vehicle door unlocking apparatus 20 is configured to unlock the door 12 locked by the door locker 11, based on a state of the vehicle 10. Non-limiting examples of the state of the vehicle 10 may include a state in which a power supply to be described later is lost and a state in which the contact event has occurred.

The vehicle door unlocking apparatus 20 includes a release operator 21 and a module mechanism 22. The release operator 21 and the module mechanism 22 may be disposed on a rear side of the opening and closing operator 14.

The release operator 21 may be a device that is disposed in the door 12 and configured to unlock the door 12 with a manual operation. In some embodiments, the release operator 21 may be a key cylinder 211 that is to be pivotally operated by an unillustrated key. The key cylinder 211 may be mechanically coupled to the latch of the door locker 11 illustrated in FIG. 1 through a wire 17 illustrated in FIG. 2B. For example, a first end of the wire 17 may be coupled to the key cylinder 211, and a second end of the wire 17 may be coupled to the latch of the door locker 11. As will be described later, when a person such as the occupant or a rescuer pulls the key cylinder 211, a pulling force derived from the pulling operation may be transmitted to the latch of the door locker 11 through the wire 17, allowing the latch to be unlatched and causing the door locker 11 to be in the unlocked state.

The module mechanism 22 is a device configured to cause the key cylinder 211 to be disposed in the door 12 with the key cylinder 211 being protrudable to the outside of the door 12. The module mechanism 22 will be described later with reference to the drawings including FIG. 3A.

Figure 3A:
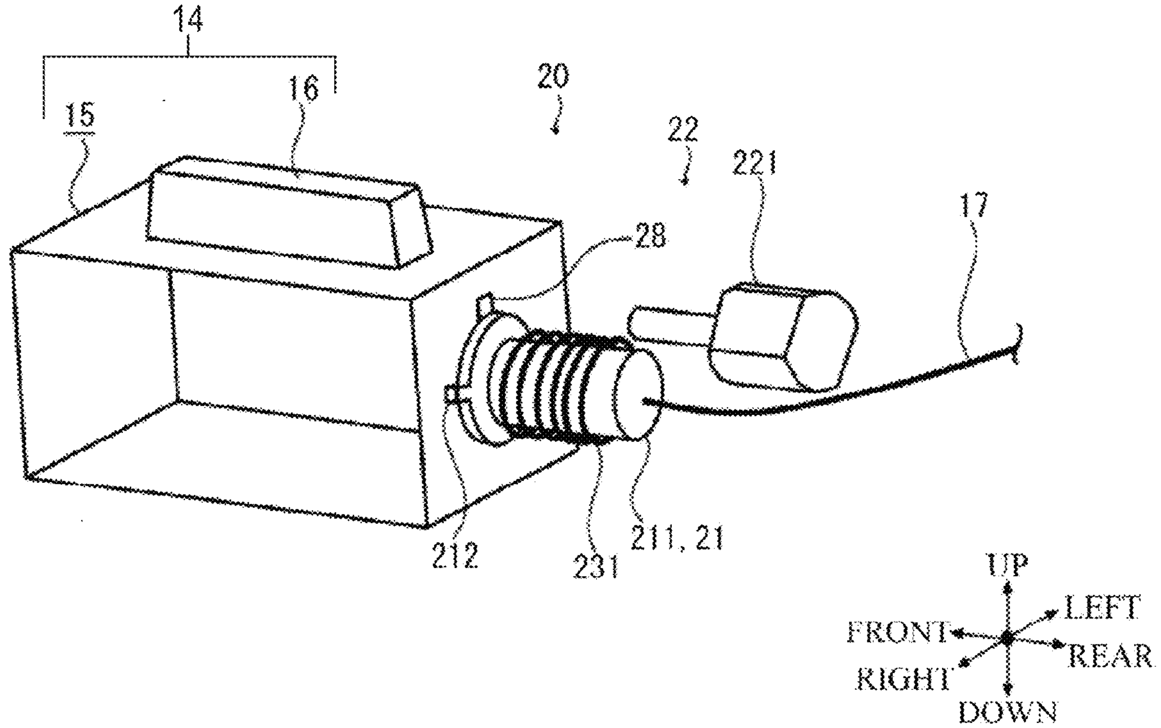
FIG. 3A is a perspective view of the vehicle door unlocking apparatus illustrated in FIG. 1.
Figure 3B:
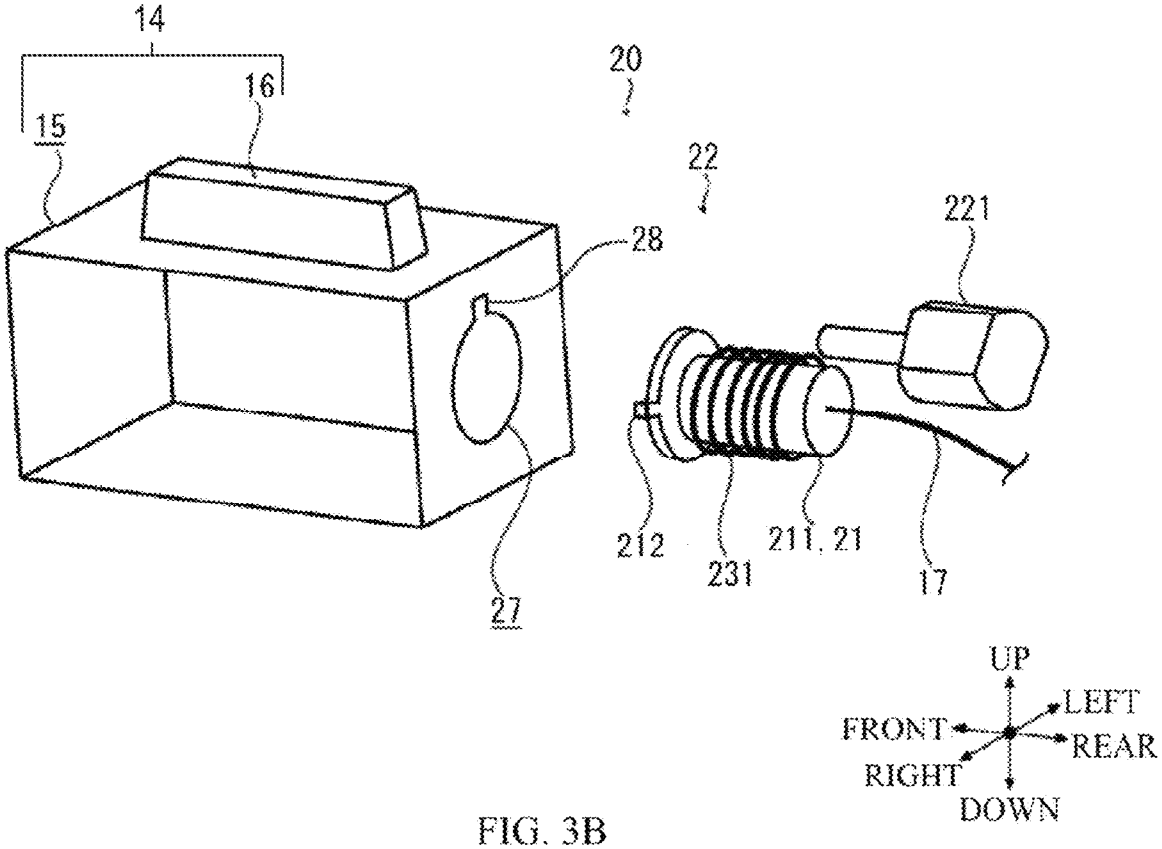
FIG. 3B is an exploded perspective view of the vehicle door unlocking apparatus illustrated in FIG. 1.

FIG. 3A is a perspective view of the vehicle door unlocking apparatus 20. FIG. 3B is an exploded perspective view of components including a module body 221 and the module mechanism 22.

Referring to FIG. 3A, the module mechanism 22 of the vehicle door unlocking apparatus 20 may include the module body 221 and a biasing member 23. In some embodiments, the biasing member 23 may be a spring 231.

The module body 221 may be a device such as a motor. The module body 221 may be configured to rotate the key cylinder 211 in an emergency. For example, the module body 221 may have a rotary shaft at a front end. An unillustrated motor-side gear may be fixed to the rotary shaft. An unillustrated cylinder-side gear may be disposed at the rear of the key cylinder 211. The motor-side gear and the cylinder-side gear may be meshed with each other. This configuration rotates the key cylinder 211 by the module body 221 and allows the module body 221 to protrude to the outside of the vehicle 10 in an emergency. An example operation of the module mechanism 22 in an emergency will be described later with reference to the drawings including FIG. 5A.

The spring 231 may be any spring such as a coil spring. The spring 231 may be so disposed as to be in contact with the module body 221. The spring 231 may be compressed in a front-rear direction of the vehicle 10 in a normal state, and urge the key cylinder 211 toward the front. As will be described later, the spring 231 may push the key cylinder 211 toward the outside of the vehicle 10 in an emergency.

The locker 212 may be a part of the key cylinder 211. The locker 212 may be a region in which a part of a front end of the key cylinder 211 is protruded outward in a radial direction. In an illustrated example embodiment, a part of the front end of the key cylinder 211 may be protruded rightward. The locker 212 may come into contact with a rear side surface of the recess 15 from the rear as illustrated in FIG. 3A in the normal state.

Referring to FIG. 3B, the rear side surface of the recess 15 may have an attachment hole 27 and a through hole 28. The attachment hole 27 and the through hole 28 may be continuous openings formed on the rear side surface of the recess 15.

The attachment hole 27 may be an opening having a substantially circular shape. The attachment hole 27 may have a size about the same as or slightly larger than the front end of the key cylinder 211.

The through hole 28 may be an opening continuous with the attachment hole 27. In an illustrated example embodiment, the through hole 28 may be a substantially rectangular opening that continues upward from an upper end of the attachment hole 27. The through hole 28 may have a size about the same as or slightly larger than the locker 212.

Figure 4:
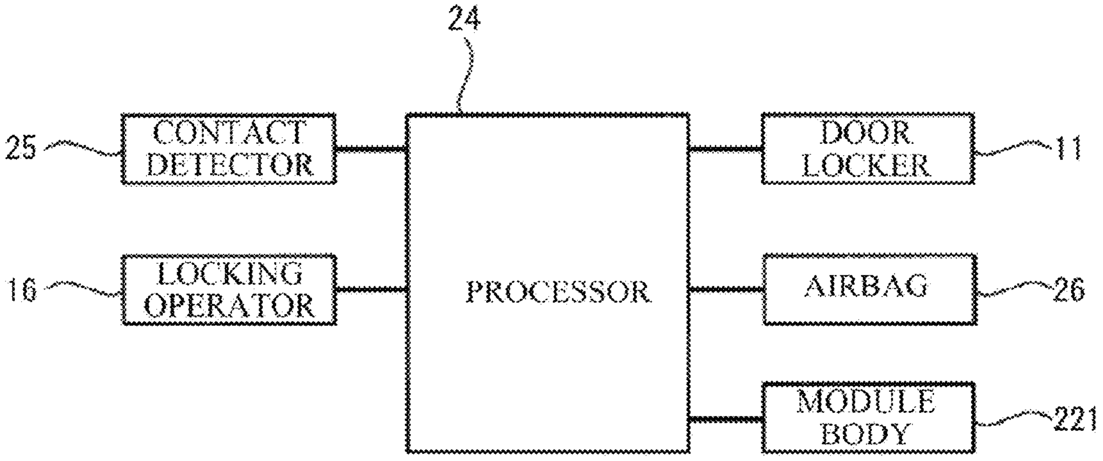
FIG. 4 is a block diagram illustrating a connection configuration of the vehicle door unlocking apparatus illustrated in FIG. 1.

FIG. 4 is a block diagram illustrating a connection configuration of the vehicle 10 including the vehicle door unlocking apparatus 20.

The processor 24 may be a semiconductor device such as a central processing unit (CPU). The processor 24 may include, as a storage, a semiconductor memory device such as a random-access memory (RAM) or a read-only memory (ROM). The storage may store programs, parameters, and the like. The processor 24 may execute an operation and a method to be described later, based on the programs, the parameters, and the like read from the storage.

The processor 24 may have terminals coupled to a contact detector 25, the locking operator 16, the door locker 11, an airbag 26, and the module body 221.

The locking operator 16 may have a configuration described above. The locking operator 16 may transmit, to the processor 24, a signal based on an operation performed by the occupant.

The contact detector 25 may be any sensor such as an acceleration sensor or a pressure sensor. The contact detector 25 may transmit, to the processor 24, a signal indicating that the contact event of the vehicle 10 has occurred.

The door locker 11 may have a configuration described above. The door locker 11 may be placed into the locked state or the unlocked state, based on instructions from the processor 24 in response to an operation performed on the locking operator 16.

The airbag 26 may be a bag-shaped device for cushioning and disposed, in a vehicle compartment of the vehicle 10, adjacent to the occupant, for example, in the front or the side of the occupant. When the contact event of the vehicle 10 occurs, the airbag 26 may develop and expand based on instructions from the processor 24 in response to a result of the detection performed by the contact detector 25.

As illustrated in FIG. 3A, the module body 221 may be a device including the motor. The module body 221 may rotate the key cylinder 211 illustrated in FIG. 3A, based on instructions from the processor 24.

An example operation of the vehicle door unlocking apparatus 20 having the configuration described above in the normal state will be described. When riding on the vehicle 10, the occupant may operate the locking operator 16 of the opening and closing operator 14 illustrated in FIG. 2A. Thus, the processor 24 may operate, based on an output of the locking operator 16, the actuator of the door locker 11 to cause the door 12 to be in the unlocked state from the locked state. Thereafter, the occupant may put his/her hand at the recess 15 and rotate the door 12 to open the door 12. The processor 24 may operate the actuator of the door locker 11 to lock the door 12 when the occupant rides on the vehicle 10 and run the vehicle 10.

The vehicle door unlocking apparatus 20 makes it possible to cause, with a manual operation, the door locker 11 to be in the unlocked state from the locked state in an emergency such as when the power supply of the vehicle 10 is lost or when the contact event of the vehicle 10 occurs.

First, a method will be described of unlocking the door locker 11 by the vehicle door unlocking apparatus 20, based on, for example, an operation to be performed by the occupant present outside of the vehicle 10, where the power supply of the vehicle 10 is lost.

Referring to FIG. 1, no electric power may be supplied to the locking operator 16 and the door locker 11 when the power supply is lost due to, for example, discharging of a battery mounted on the vehicle 10. Accordingly, the door locker 11 does not operate even if the occupant operates the locking operator 16 to open the door 12 from the outside, making it difficult to cause the door locker 11 to be in the unlocked state. Further, the door 12 may not have an outdoor handle as described above, making it difficult for the occupant to open the door 12 by operating the outdoor handle as well.

The example embodiment allows the door locker 11 to be in the unlocked state with a manual operation, that is, by operating the key cylinder 211 illustrated in FIG. 2A by the key of the occupant. For example, the occupant may insert the unillustrated key into the key cylinder 211 through a keyhole 18 illustrated in FIG. 2A.

Figure 5A:
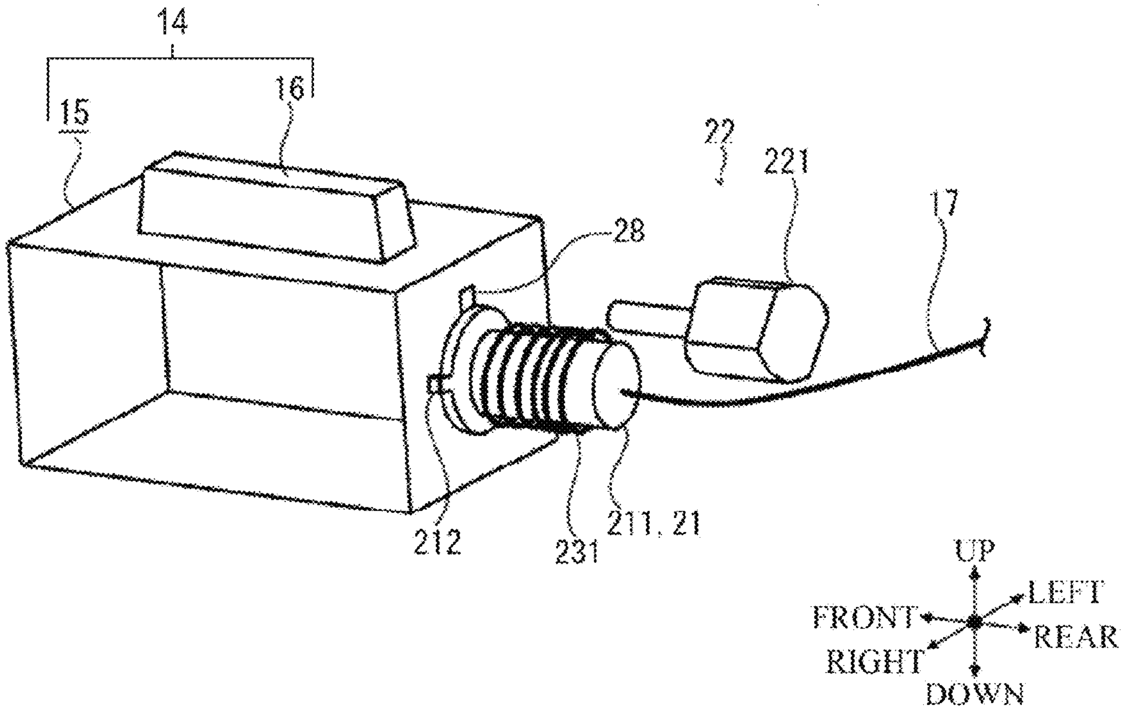
FIG. 5A is a perspective diagram illustrating an operation, of the vehicle door unlocking apparatus illustrated in FIG. 1, of protruding a key cylinder to the outside.

Thereafter, referring to FIG. 5A, the occupant may rotate the key cylinder 211 using the unillustrated key. Thus, the key cylinder 211 may rotate clockwise when viewed from the rear. The locker 212 may also rotate clockwise together with the key cylinder 211.

Figure 5B:
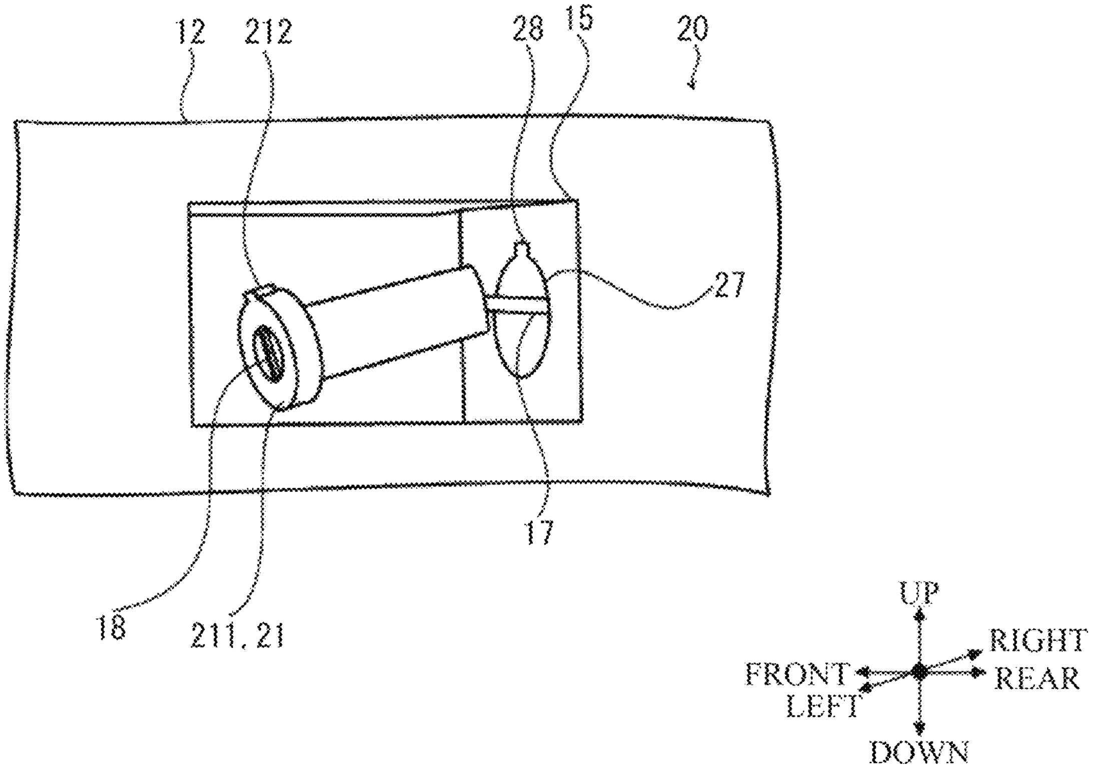
FIG. 5B is a perspective diagram illustrating a state, of the vehicle door unlocking apparatus illustrated in FIG. 1, in which the key cylinder is protruded to the outside.

Accordingly, referring to FIG. 5B, a position of the locker 212 and a position of the through hole 28 may coincide with each other in a circumferential direction of the key cylinder 211, preventing a locking operation of the locker 212 from working. Thus, the module body 221 may be released to the inside of the recess 15, i.e., to the outside of the vehicle 10, through the attachment hole 27 owing to a biasing force of the spring 231. Thereafter, the occupant may pull the module body 221 by a hand to apply the pulling force to the latch of the door locker 11 illustrated in FIG. 1 through the wire 17, causing the door locker 11 to be in the unlocked state. This configuration allows the occupant to open the door 12 and ride on the vehicle 10. Further, referring to FIGS. 5A and 5B, the key cylinder 211 that has protruded to the outside may be accommodated inside the door 12 from the attachment hole 27 by an operation of a person such as the occupant or a worker, following which the key cylinder 211 may be rotated in an opposite direction to the above, which makes it possible to return the door 12 to the original state.

Next, a method will be described of unlocking the door locker 11 by the vehicle door unlocking apparatus 20, based on, for example, the instructions from the processor 24 where an event such as a contact event of the vehicle 10 has occurred.

Referring to FIG. 4, when an event such as the contact event has occurred upon traveling of the vehicle 10, the contact detector 25 may transmit, to the processor 24, data indicating that a predetermined impact or more has acted on the vehicle 10.

The processor 24 may expand and develop the airbag 26 to protect the occupant, based on the data inputted from the contact detector 25. The processor 24 may also transmit, to the module body 221, data adapted to cause the door 12 to be in the unlocked state.

Referring to FIG. 5A, the rotary shaft of the module body 221, which may be the motor in some embodiments, may be rotated based on the data inputted from the processor 24. The rotary shaft of the module body 221 and the key cylinder 211 may be meshed with each other as described above. Thus, the module body 221 may cause the key cylinder 211 to rotate clockwise when viewed from the rear. This rotation may cause the position of the locker 212 and the position of the through hole 28 to coincide with each other in the circumferential direction, releasing the locking by the locker 212 and causing the key cylinder 211 to be pushed forward by the biasing force of the spring 231. Accordingly, as illustrated in FIG. 5B, the key cylinder 211 may protrude toward the inside of the recess 15, i.e., toward the outside of the vehicle 10. Thereafter, when a person such as the rescuer outside the vehicle 10 grasps the key cylinder 211 and pulls the key cylinder 211, the door locker 11 illustrated in FIG. 1 may be placed into the unlocked state through the wire 17 coupled to the key cylinder 211. Placing the door locker 11 into the unlocked state allows a person such as the rescuer to open the door 12 and rescue the occupant present in the vehicle 10.

It should be noted that the operation of protruding the key cylinder 211 to the outside upon the occurrence of the contact event may not be based on the spring 231. In some embodiments, the key cylinder 211 may be configured to protrude forward based on an impact energy derived from the contact.

Hereinafter, some inventive concepts to be appreciated from the above-described example embodiment will be described together with example effects thereof.

A vehicle door unlocking apparatus according to at least one embodiment of the disclosure is configured to, based on a state of a vehicle to which the vehicle door unlocking apparatus is to be applied, unlock the door of the vehicle locked by the door locker. The vehicle door unlocking apparatus includes a release operator and a module mechanism. The release operator is disposed in the door and configured to unlock the door with a manual operation, and mechanically coupled to the door locker. The module mechanism is configured to cause the release operator to be disposed in the door with the release operator being protrudable to the outside of the door. The vehicle door unlocking apparatus according to at least one embodiment of the disclosure causes the release operator to protrude to the outside by, for example, an operation of a person such as the occupant and allows the release operator to be pulled upon an event such as the vehicle contact or the power loss, based on the state of the vehicle. Thus, the door locker mechanically coupled to the release operator is placed into the unlocked state, allowing the door to be opened. Accordingly, this configuration helps to allow the door to be opened from the outside and smoothly perform an activity such as the rescue of the occupant present in the vehicle upon an event such as the contact or the power loss.

In some embodiments, the door locker may be configured to unlock the door, based on an electric control. The door handle may not be present on the outer surface of the door of the vehicle in which the unlocking operation of the door is performed based on the electric control. Even in such a case, this configuration causes the release operator to protrude to the outside of the door upon an event such as the contact or the power loss, which in turn helps to allow the door to be easily unlocked by pulling the release operator.

In some embodiments, the release operator may include a key cylinder configured to be pivotally operated. This configuration allows the key cylinder to be protruded to the outside of the door by inserting the key into the key cylinder and rotating the key cylinder upon an event such as the power loss, thus making it possible to unlock the door by pulling the key cylinder by a manual force. The configuration in which the release operator includes the key cylinder helps to improve security.

In some embodiments, the release operator may be configured to protrude to the outside of the door when a contact event of the vehicle occurs. In some embodiments, the release operator may be configured to protrude to the outside of the door when the mechanical coupling between the release operator and the door locker is pivotally released. This configuration causes the release operator to protrude to the outside of the door when the contact event of the vehicle occurs and allows a person such as the rescuer to pull the release operator to unlock the door locker. Accordingly, this configuration allows the door to be opened from the outside of the vehicle to smoothly rescue the occupant when an event such as the contact event of the vehicle occurs.

In some embodiments, the vehicle door unlocking apparatus may further include a biasing member. The biasing member may be configured to cause the release operator to protrude to the outside of the door when the contact event occurs. In some embodiments, the biasing member may be configured to cause the release operator to protrude to the outside of the door when the mechanical coupling between the release operator and the door locker is pivotally released. This configuration helps to cause the release operator to protrude to the outside by the biasing member when the contact event occurs. In some embodiments, the biasing member may include the spring.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. The techniques according to the example embodiment and its modification examples described above may be combined in any combination.

As used herein, the term "collision" may be used interchangeably with the term "contact".

The processor 24 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 24 illustrated in FIG. 4.

The invention claimed is:

1. A vehicle door unlocking apparatus comprising:

a key cylinder disposed in the door and configured to be rotatable, the a key cylinder being mechanically coupled through a wire to a latch of a door locker, the key cylinder having a locker protruding outward in a radial direction at a front end of the key cylinder;

a biasing member urging the key cylinder toward an outer side of the door;

a recess having an attachment hole and a through hole continuous with the attachment hole, the attachment hole being sized to receive the front end of the key cylinder, the through hole being sized to receive the locker, the locker being engageable with a rear side surface of the recess to prevent protrusion of the key cylinder by a biasing force of the biasing member; and a processor configured to:

detect a state of the vehicle including a contact event; and in response to detecting the state of the vehicle, cause the key cylinder to be rotated, wherein, when the key cylinder is rotated such that a position of the locker and a position of the through hole coincide with each other in a circumferential direction of the key cylinder, the key cylinder is caused to protrude through the attachment hole to the outer side of the door by the biasing member and is pullable to mechanically unlock the door locker.

2. The vehicle door unlocking apparatus according to claim 1, wherein the key cylinder is configured to be manually rotated by a key when a power supply of the vehicle is lost.

3. The vehicle door unlocking apparatus according to claim 1, further comprising a motor configured to rotate the key cylinder, wherein the processor is further configured to cause the motor to rotate the key cylinder such that the key cylinder protrudes through the attachment hole.

4. A vehicle door unlocking apparatus comprising:

a recess formed in a door and having a rear side surface with an attachment hole and a through hole continuous with the attachment hole;

a key cylinder disposed rearward of the recess and mechanically coupled through a wire to a latch of a door locker, the key cylinder having a locker protruding outward in a radial direction at a front end of the key cylinder;

a motor disposed rearward of the key cylinder and having a rotary shaft;

a motor-side gear fixed to the rotary shaft;

a cylinder-side gear disposed at the key cylinder and meshed with the motor-side gear;

a spring configured to urge the key cylinder toward the attachment hole;

wherein rotation of the key cylinder by the motor causes a position of the locker and a position of the through hole to coincide with each other in a circumferential direction of the key cylinder, thereby causing the key cylinder to protrude through the attachment hole by a biasing force of the spring, and wherein pulling the key cylinder applies a pulling force to the latch through the wire to place the door locker into an unlocked state.

5. The vehicle door unlocking apparatus according to claim 4, further comprising a processor coupled to a contact detector and the motor, wherein the processor is configured to cause the motor to rotate the key cylinder in response to data indicating that a contact event of a vehicle has occurred being inputted from the contact detector.

6. The vehicle door unlocking apparatus according to claim 4, wherein the key cylinder is configured to be manually rotated by a key when a power supply of a vehicle is lost.

* * * * *